United States Patent
Scelsi et al.

(10) Patent No.: US 7,369,966 B1
(45) Date of Patent: May 6, 2008

(54) METHODS AND APPARATUS TO DESIGN A WHEEL OF A MULTIPLE-AXLE VEHICLE

(75) Inventors: Anthony Scelsi, Elkhart, IN (US); Thomas Regnier, South Bend, IN (US); Slawomir T. Fryska, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/705,294

(22) Filed: Feb. 12, 2007

(51) Int. Cl.
*G06F 11/30* (2006.01)
*G21C 17/00* (2006.01)

(52) U.S. Cl. .................................... 702/185
(58) Field of Classification Search ......... 702/34–36, 702/183–185
See application file for complete search history.

(56) References Cited

U.S. PATENT DOCUMENTS

| | | | |
|---|---|---|---|
| 2,696,104 A | 12/1954 | Markey et al. | 73/11.04 |
| 5,323,332 A | 6/1994 | Smith et al. | 702/106 |
| 5,511,430 A | 4/1996 | Delest et al. | 73/802 |
| 5,531,122 A * | 7/1996 | Chatham et al. | 73/760 |
| 6,125,333 A | 9/2000 | Pun | 702/42 |
| 6,273,613 B1 | 8/2001 | O'Brien et al. | 384/448 |
| 6,902,136 B2 | 6/2005 | Mackness | 244/100 R |
| 6,929,333 B2 | 8/2005 | DeVlieg | 303/20 |
| 2003/0114995 A1 | 6/2003 | Su et al. | 702/34 |
| 2006/0144997 A1 | 7/2006 | Schmidt et al. | 244/100 R |

FOREIGN PATENT DOCUMENTS

| | | | |
|---|---|---|---|
| JP | 09-243518 | * | 9/1997 |
| WO | 0241193 | | 5/2002 |

* cited by examiner

*Primary Examiner*—Michael Nghiem
(74) *Attorney, Agent, or Firm*—Birch, Stewart, Kolasch & Birch, LLP

(57) ABSTRACT

Methods and apparatus to design a wheel of a multiple-axle vehicle are disclosed. A disclosed method analyzes fatigue damage values of wheels, each to be installed at a number of axle positions on a vehicle, and includes determining for each wheel a fatigue damage value for each of a plurality of critical locations at the wheel during an installation and determining whether at least a subset of total fatigue damage values at critical locations for each wheel installation exceeds a respective threshold total fatigue damage value.

20 Claims, 6 Drawing Sheets

CRITICAL LOCATION 1

CRITICAL LOCATION 4

CRITICAL LOCATION 2

CRITICAL LOCATION 5

CRITICAL LOCATION 3

CRITICAL LOCATION 6

METHODS AND APPARATUS TO DESIGN A WHEEL OF A MULTIPLE-AXLE VEHICLE

FIELD OF THE DISCLOSURE

This disclosure relates generally to multiple-axle vehicles, and more particularly, to methods and apparatus to design an aircraft wheel to be installed randomly on an axle of a multiple-axle aircraft.

BACKGROUND

The aerospace industry has designed and manufactured increasingly larger new aircraft. Typically, these large aircraft have multiple sets of main landing gears, each including multiple-axles. Generally, each main landing gear axle has at least one main wheel and brake assembly, and most axles (in many cases all of the axles of the main landing gears) include two main wheel and brake assemblies. The main wheel assemblies of the main wheel and brake assemblies are designed to handle the aircraft loads experienced during landing, braking, taxiing and take-off operations. However, the loads transmitted by the axles of the main landing gears to the main wheel assemblies, and vice versa, are usually not the same at each of the axles of the multiple-axle aircraft. Additionally, the main wheel assemblies are designed to be installed on any axle of the main landing gears of the aircraft. Thus, it has been a common practice to provide one structural design of the main wheel assembly to enable use of the main wheel assembly on any axle of the main landing gears. However, the one structural design is configured to withstand the static and fatigue loads of the axle or axles experiencing the greatest loads (e.g., the axle that is imposing the greatest amount of fatigue load or stress upon the main wheel). This structural design approach can result in the main wheel assemblies having a weight that contributes substantially to the overall weight of the landing gears of the aircraft.

DETAILED DESCRIPTION

In general, example methods and apparatus disclosed herein to design a wheel of a multiple-axle vehicle may be applied to wheels that are manufactured from any type of materials and/or by any type of manufacturing methods. Additionally, while the examples disclosed herein are described in connection with aircraft wheel designs in the aerospace industry, the teachings of this disclosure may also be applicable to design applications for different vehicles, equipment, parts and/or mechanisms in different industries.

Figure 1:
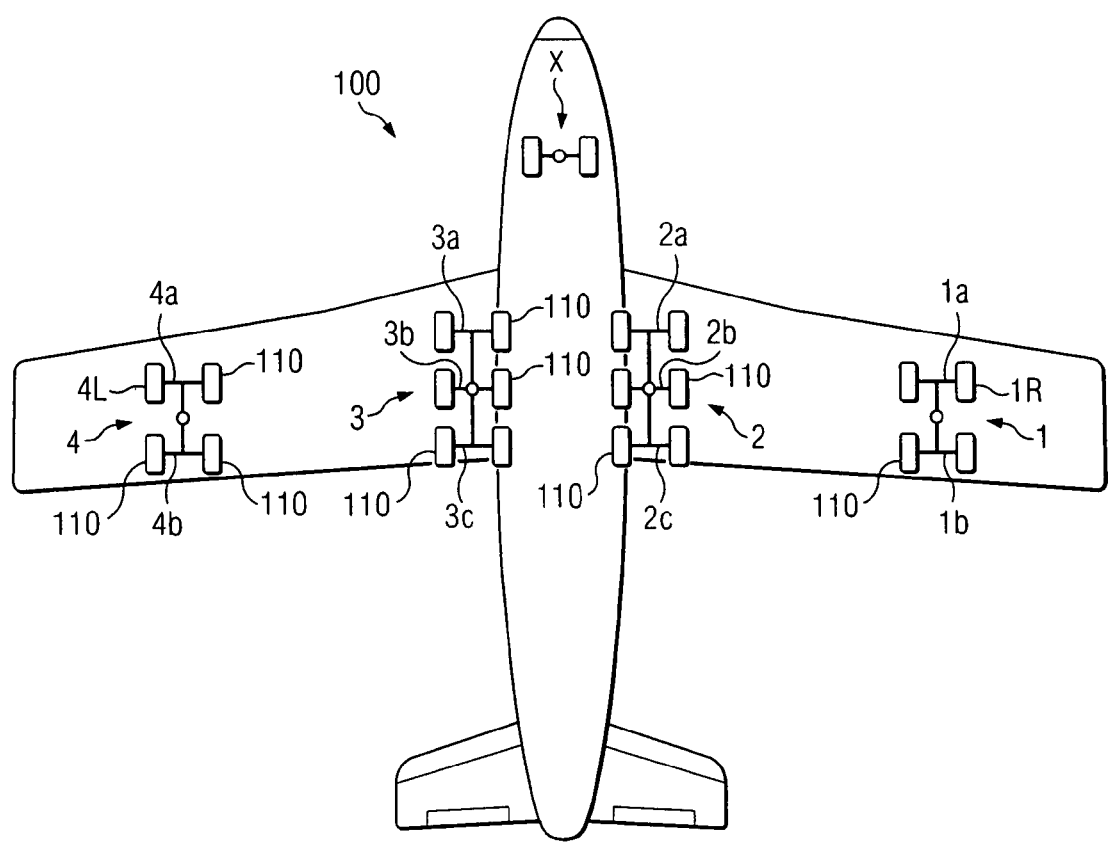
FIG. 1 is a schematic illustration of the bottom of an aircraft having multiple sets of landing gears.

FIG. 1 is a schematic illustration of the bottom of an example large commercial, multiple-axle aircraft 100 having a nose landing gear X and four main landing gears 1-4 that include a total of ten main axles 1a, 1b, 2a, 2b, 2c, 3a, 3b, 3c, 4a and 4b supporting twenty main wheel assemblies or main wheels 110. In the prior art, the structural design of the main wheel 110 is based upon the fatigue loads (e.g., the fatigue stress or fatigue damage data) present at the most critical wheel position on the axles of the aircraft 100. In actual use, the main wheel 110 is mounted randomly upon any of the ten main axles 1a-4b of the multiple-axle aircraft 100 during the service life or wheel life of the main wheel 110. In FIG. 1, the ten main axles 1a-4b are distributed evenly as five main axles 1a, 1b, 2a, 2b and 2c on one side of the aircraft 100 and five main axles 3a, 3b, 3c, 4a and 4b on the opposite side of the aircraft 100 (e.g., in a mirror image arrangement). Thus, the fatigue loads or fatigue damage data for the most critical main wheel position of one main wheel 110 on one side of the aircraft 100 is substantially the same for the mirror image wheel position on the other side of the aircraft 100. For example, the fatigue damage data for the far left main wheel 4L on the axle 4a is substantially the same as the fatigue damage data for the far right main wheel 1R on the axle 1a. The most critical main wheel position represents approximately ten percent (2 main wheel positions/20 main wheel positions) of the total twenty main wheel positions of the aircraft 100. Therefore, the fatigue loads or fatigue damage data at the most critical main wheel position is applicable to an average of about ten percent of the service life of the main wheel 110. In other words, on average the example main wheel 110 is located at a most critical main wheel position about ten percent of the service life of the main wheel 110. During the remaining approximately ninety percent of the service life of the main wheel 110, the example main wheel 110 is located at main wheel positions which have fatigue loads less severe than the fatigue loads at the most critical main wheel position. As a result of following the prior art practice of designing the structure of the main wheel 110 to accommodate the fatigue loads applicable to the most critical main wheel position, the main wheel 110 is heavier than required for about ninety percent of its service life. Therefore, it is highly desirable that the design of the main wheel 110 include a consideration of the less critical main wheel positions where the main wheel 110 will likely be installed and used throughout most, if not nearly all, of its service life.

Figure 2:
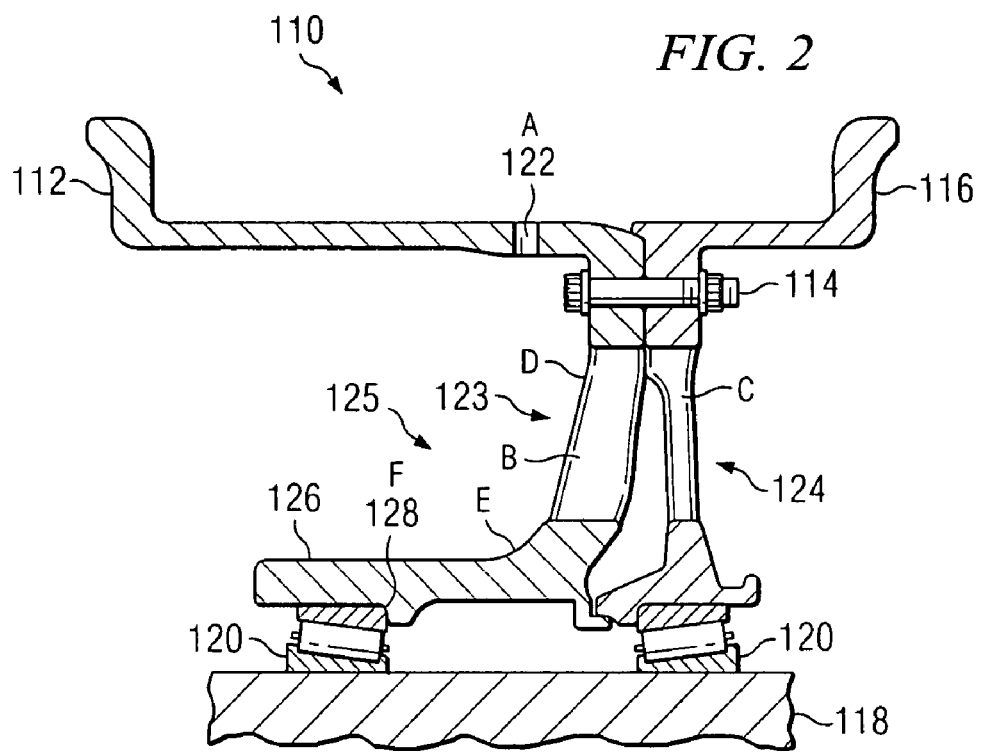
FIG. 2 is a partial cut-away illustration of the upper part of an example aircraft main wheel.

FIG. 2 is a cut-away view of the upper part of the main wheel 110. The main wheel 110 includes an inboard wheel half 112 attached by fasteners or tie bolts 114 to an outboard wheel half 116. The inboard wheel half 112 and the outboard wheel half 116 are each supported upon an axle 118 by a respective set of bearings 120. The main wheel 110 has six critical locations where fatigue stresses are concentrated at the main wheel. The first critical location A is a fuse plug hole 122, the second and third critical locations B and D are spoke windows also indicated generally by reference numeral 123, the fourth critical location C is a wheel spoke indicated generally by reference numeral 124, the fifth critical location E is a radial transition of the spoke 125 to a wheel hub 126, and the sixth critical wheel location F is a bearing bore radius 128. It should be clearly understood that the designs of other wheels may have similar and/or different critical wheel locations where critical fatigue stresses are located for each wheel design.

Figure 3:
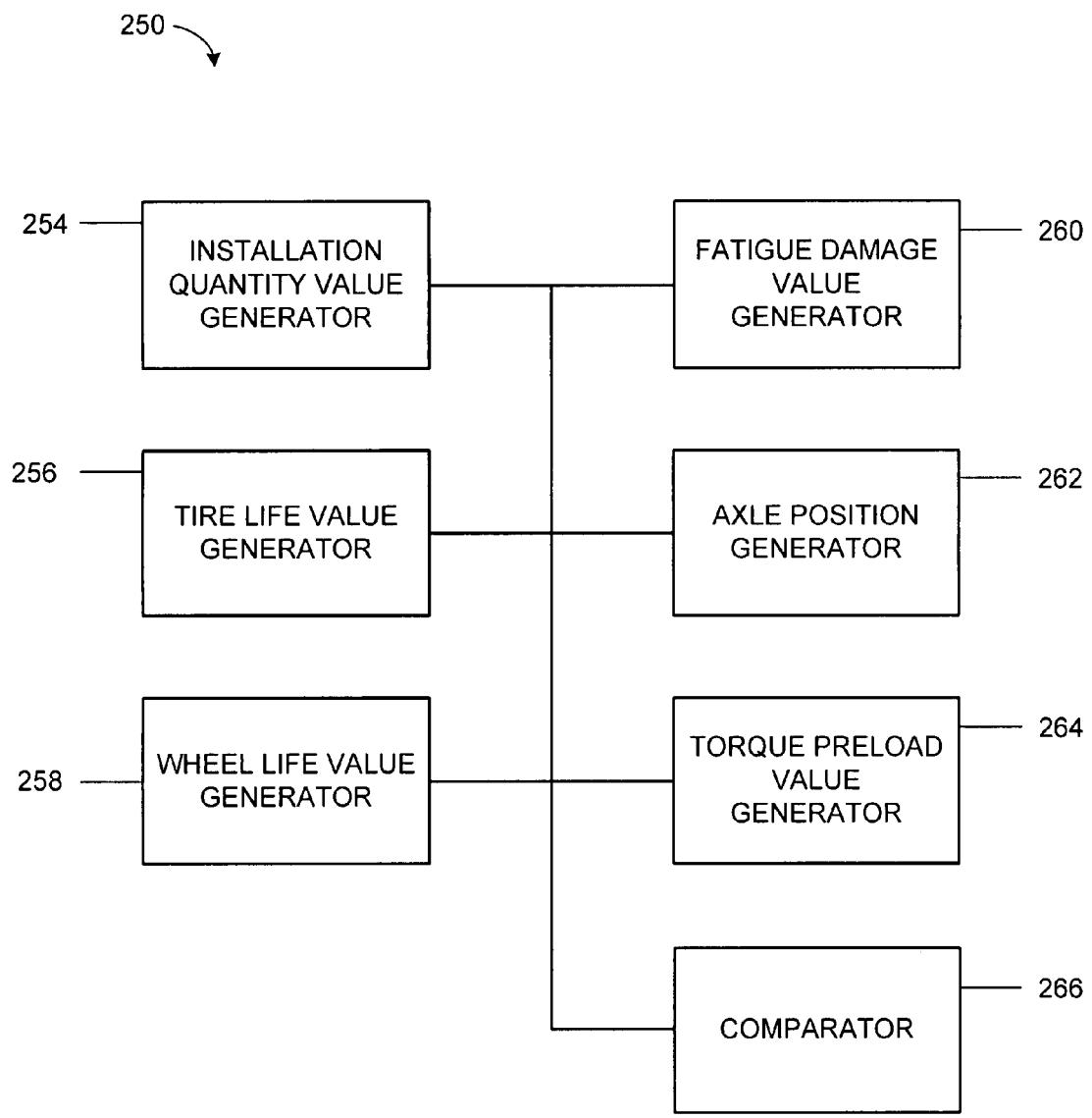
FIG. 3 is an apparatus constructed in accordance with the teachings of the disclosure to design a wheel of a multiple-axle vehicle.
Figure 5A:
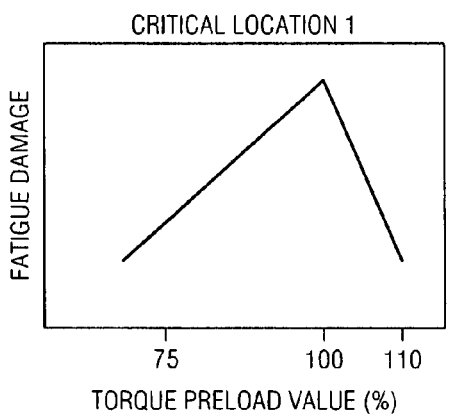
FIGS. 5A-F are charts illustrating the fatigue damage at each of six critical locations of the example aircraft main wheel for the tie bolt torque preload values of the respective chart.
Figure 5D:
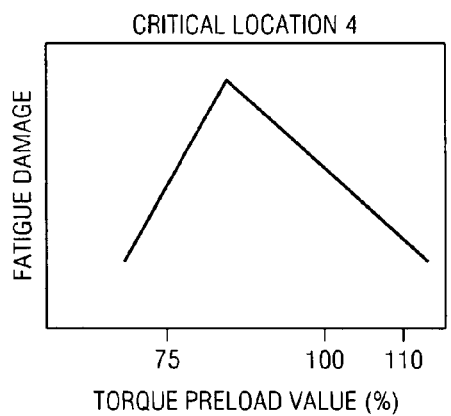
Figure 5B:
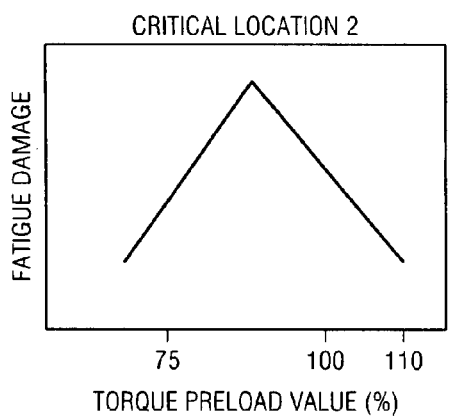
Figure 5E:
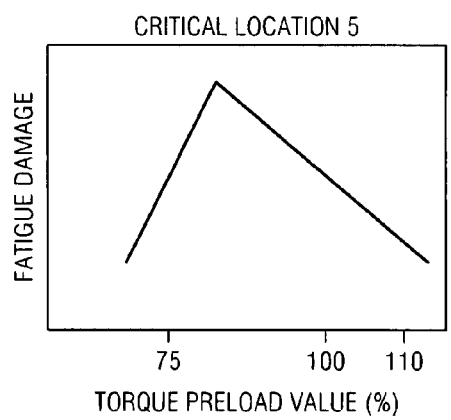
Figure 5C:
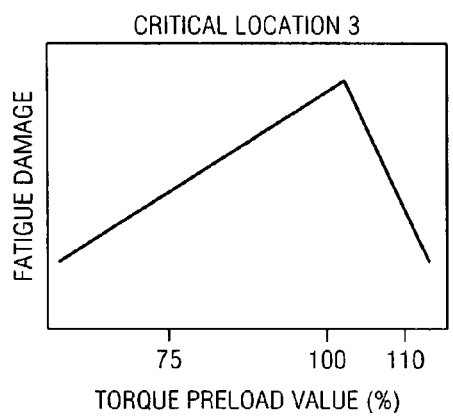
Figure 5F:
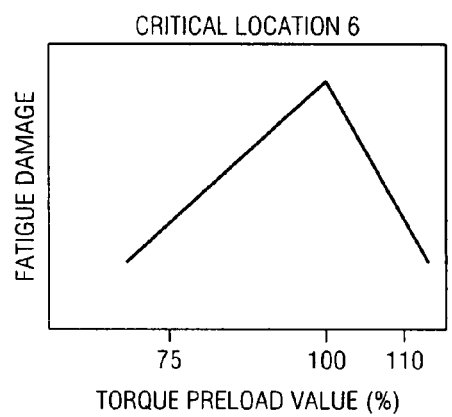

During its service life, the main wheel 110 may be installed randomly at any of the twenty main wheel positions on the ten main axles 1a-4b of the multiple-axle aircraft 100 illustrated in FIG. 1. In the example of FIG. 3, an example apparatus 250 is used to simulate the random mounting of a large number of example main wheels 110 on the main axles 1a-4b of the aircraft 100, and to determine whether or not the structural design of the example main wheel 110 will withstand the accumulated fatigue stress or fatigue damage transmitted to each of the critical fatigue stress locations at the main wheel 110 during its service life. In particular, for each of the critical fatigue stress locations at the example main wheel 110, the example apparatus 250 performs an analysis to determine the fatigue damage accumulated during the service life of the example main wheel 110. The example apparatus 250 then performs the analysis for a large number of service lives of the example main wheel 110, and then determines, at each of the critical fatigue stress locations at the example main wheel 110 for the large number of service lives, whether or not the structural design of the example main wheel 110 exceeds a threshold fatigue damage value. If the statistical analysis confirms that the structural design of the example main wheel 110, at each of the critical fatigue stress locations, does not exceed the threshold fatigue damage value, then the example main wheel 110 may be used on the multiple-axle aircraft 100 even though its structural design does not meet the fatigue damage requirements for an entire service life of the example main wheel 110 at the most critical axle location(s).

As shown in FIG. 3, the example apparatus 250 includes an installation quantity value generator 254, a tire life value generator 256, a wheel life value generator 258, a fatigue damage value generator 260, an axle position generator 262, a torque preload value generator 264, and a comparator 266, all of which may be implemented using any desired combination of hardware, firmware, and/or software. For example, one or more integrated circuits, discrete semiconductor components, or passive electronic components may be used. Additionally or alternatively, some or all of the blocks of the example apparatus 250, or parts thereof, may be implemented using instructions, code, and/or other software and/or firmware, etc. stored on a machine accessible medium that, when executed by, for example, a processor system (e.g., the example processor system 410 of FIG. 7), perform the operations represented in the flow diagram of FIG. 6.

To determine a number of installations of the example main wheel 110 on the aircraft 100, the example apparatus 250 is provided with the installation quantity value generator 254. The number of installations of the example main wheel 110 on the aircraft 100 is a parameter used by the example apparatus 250 to perform fatigue wheel analysis via, for example, simulation. In particular, during its lifetime the example aircraft main wheel 110 will be installed randomly a number of times on the main axles 1a-4b of the multiple-axle aircraft 100. For each installation, a new aircraft tire (not shown) is mounted on the example main wheel 110 shown in FIG. 1. Typically, a new aircraft tire has an approximate service life or tire life for use with the example main wheel 110. To determine the tire life of the example main wheel 110, the example apparatus 250 is provided with a tire life value generator 256. The tire life may be expressed as either the number of aircraft landings or as the number of kilometers the tire will travel on the ground during its service life. In a similar manner, the service life or wheel life of the example main wheel 110 may be expressed either as the number of landings the example aircraft main wheel 110 may be used or as the number of kilometers the example main wheel 110 may travel on the ground. To determine the wheel life of the example main wheel 110, the example apparatus 250 is provided with a wheel life value generator 258. In some example implementations, the tire life value generator 256 and the wheel life value generator 258 may be configured to determine tire life values and wheel life values, respectively, by performing mathematical, statistical, or other types of operations. In other example implementations, the tire life value generator 256 and the wheel life value generator 258 may be configured to retrieve tire life values and wheel life values from user input data or other stored data that specify particular tire life and wheel life values. The installation quantity value generator 254 may be configured to determine the number of installations of the example main wheel 110 upon the main axles 1a-4b by dividing the wheel life (number of landings or kilometers of travel) by the tire life (respective number of landings or kilometers of travel).

The tire life may be either a constant value (e.g., such as 270 landings) or may be selected at random from a normal (Gaussian) distribution (e.g., such as an average of 270 landings and a standard deviation of 10 landings). Alternatively, tire life may be kept constant for each installation during the service life of the example main wheel 110. The impact of various tire lives, for example, 230 landings and ending at 320 landings, could be obtained by running multiple wheel service life simulations.

In FIG. 1, at each main axle of the main axles 1a-4b a reaction between the tires and the ground occurs that affects the respective example main wheels 110 mounted thereon. Each example main wheel 110 experiences fatigue stress or fatigue damage related to the position of that main wheel on the respective axle. To determine fatigue stress or fatigue damage values at the most critical main wheel position (and at its mirror image position), the example apparatus 250 is provided with a fatigue damage value generator 260. A finite element analysis of the wheel is conducted for all of the main wheel positions on the main axles 1a-4b of the multiple-axle aircraft 100 to determine the fatigue damage data or values at each of the main axles 1a-4b, including fatigue damage values at the most critical main wheel position (and at its mirror image position). The fatigue damage value generator 260 is configured to linearly scale the fatigue damage values according to the tire life with respect to the wheel life of the example main wheel 110, so that the fatigue damage values represent the fatigue damage transmitted to the example main wheel 110 during one installation at the respective main wheel position upon an axle. Thus, each main wheel position at the ten main axles 1a-4b of the multiple-axle aircraft 100 will have fatigue damage values (e.g., six) corresponding to the number of critical locations (e.g., critical locations A-F in FIG. 1) at the example main wheel 110, and each fatigue damage value corresponds to one installation of the example main wheel 110 (which corresponds to one tire life).

To determine the wheel positions at which the example main wheel 110 may be installed during its life on the multiple-axle aircraft 100, the example apparatus 250 is provided with an axle position generator 262. The axle position generator 262 may be configured as a random position generator to determine the different wheel positions associated with the example main wheel 110 during its life.

Figure 4:
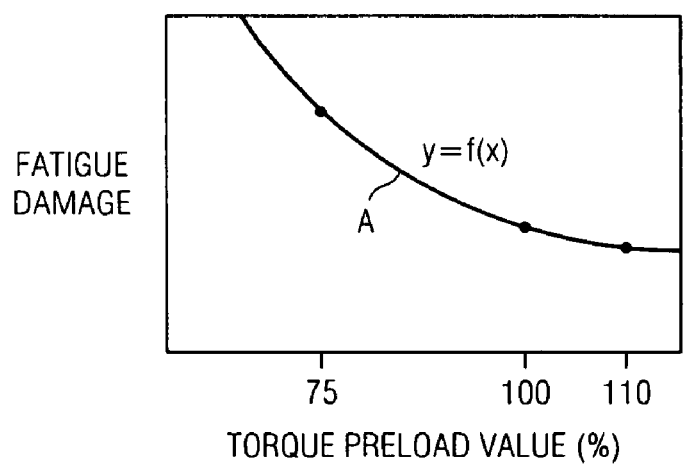
FIG. 4 is a chart illustrating a curve representing the fatigue damage experienced at a critical location on the example aircraft main wheel for a range of tie bolt torque preload values.

To determine torque preload values associated with tie bolts (e.g., the tie bolt 114 of FIG. 1), the example apparatus 250 is provided with a torque preload value generator 264. A tie bolt torque preload value is either assigned or determined from a defined distribution, depending on the analysis to be performed. Referring to FIG. 2, it has been determined that the torque preload value to which the tie bolts 14 are tightened may have a significant affect upon the fatigue stress or fatigue damage experienced at the six critical locations A-F of the example main wheel 110. For purposes of the statistical analysis, it is assumed that all of the tie bolts 114 are tightened to approximately the same torque or preload value. Referring to FIG. 4, the chart 200 illustrates a curve A that represents the fatigue stress or fatigue damage experienced at one of the critical locations A-F on the example aircraft main wheel 110 for a range of tie bolt torque preload values. The curve A fits the equation $Y=f(x)$, and the fatigue damage at any desired tie bolt torque preload value (e.g., such as 75%, 100% or 110%) may be readily ascertained from the vertical axis of the chart 200. In this example, the torque preload value generator 264 can be configured to randomly select one of three preload values at a 33.3333% probability of selection, and then the fatigue damage value generator 260 can ascertain the corresponding fatigue damage for the critical location on the example main wheel 110 and the fatigue damages for the other five critical locations based on the selected torque preload value.

Alternatively, the torque preload value generator 264 can select the preload value randomly with a uniform probability of selection, and the fatigue damage value generator 260 can ascertain the fatigue damages from the relationships illustrated in FIGS. 5A-F. In the examples of FIGS. 5A-F, the torque preload value generator 264 can be configured to obtain the fatigue stress or fatigue damage experienced at each of the critical locations A-F (see FIG. 2) of the example main wheel 110 by randomly or pseudo-randomly selecting any preload value within an interval between the minimum and maximum tie bolt preload values on the horizontal axis of the respective chart of FIGS. 5A-F. In other words, the torque preload value generator 264 can select the preload value randomly or pseudo-randomly with a uniform probability of selection from between the 50% and 110% preload values during the computer simulation, and then the fatigue damage value generator 260 can determine the corresponding fatigue damages from the charts of FIGS. 5A-F for the critical locations A-F of the example main wheel 110.

Alternatively, the torque preload value generator 264 can be configured to select at random a torque preload value from which the fatigue damage value generator 260 then ascertains the fatigue damages of the critical locations A-F. Recognizing that a uniform probability of selection of a torque preload value may be unlikely to occur, the torque preload value generator 264 may be configured to use a probability density function to determine the highest probability for the random selection of the torque preload value, and then the fatigue damage value generator 260 can determine the fatigue damages for the critical locations A-F from the relationships illustrated in the charts of FIGS. 5A-F.

Field experience for the overhauling of aircraft main wheels indicates that during an overhaul the preloading of the tie bolts 114 may result in a torque preload value that varies from the torque preload value of the tie bolts 114 during the prior overhaul. Thus, the example apparatus 250 permits the torque preload value to be selected for each installation of the example main wheel 110.

For each simulated installation, the example apparatus 250 randomly positions the example main wheel 110 upon an axle 1a-4b of the multiple-axle aircraft 100. Statistical analysis software such as, for example, Crystal Ball®, Matlab®, Mini-tab®, or SPSS®, may be used to randomly determine the axle locations for all of the installations of the example aircraft wheel 110 during its service life. For each installation, the fatigue damage value generator 260 retains the fatigue damage values of the six critical locations A-F of the example main wheel 110 illustrated in FIG. 2. For all of the installations during a service life of the example main wheel 110, the fatigue damage value generator 260 sums separately the fatigue damage values for each of the respective six critical locations A-F of the example main wheel 110 to provide a corresponding total fatigue damage value for each of the critical locations A-F.

The example apparatus 250 continues to repeat the process described above (i.e., iterate) whereby an example main wheel 110 is randomly positioned on the main axles 1a-4b of the multiple-axle aircraft 100 for the number of installations related to the service life of the example main wheel 110. For all of the installations related to one service life of the example main wheel 110, the fatigue damage value generator 260 sums the individual fatigue damage values for each of the six critical locations A-F to provide a total fatigue damage value for each critical location A-F. The example apparatus 250 continues until the simulation of the use of a large number of new example main wheels 110 such as, for example, ten thousand or twenty-five thousand example main wheels 110, is reached and stored. At this point, the example apparatus 250 has generated and stored the data for a large number of rows of total fatigue damage values, with each row of data having damage values corresponding to the number of critical fatigue stress locations at the example main wheel 110 (e.g., six values for the critical locations A-F of the example main wheel in FIG. 2).

Generally, the example apparatus 250 may execute for a predetermined number of simulations (e.g., such as 10,000 or 25,000) or until the fatigue damage value for each of the critical locations A-F is substantially the same as the fatigue damage value of the critical location for the immediately prior installation. To compare the fatigue damage values generated, the example apparatus 250 is provided with a comparator 266 (see FIG. 3).

A software program performing a statistical analysis process such as Monte Carlo, may be used to simulate the use of large numbers of wheels, such as ten or twenty-five thousand, on the multiple-axle aircraft 100. For each critical wheel location A-F, the example apparatus 250 interrogates the stored total fatigue damage values to determine if each total fatigue damage value of a large portion (such as, for example, ninety-five percent, of the interrogated stored total fatigue damage values) does not exceed a threshold total fatigue damage value for the example main wheel 110. Computer software such as, for example, Crystal Ball®, Matlab®, Mini-tab®, or SPSS®, may be used to perform the analysis or interrogation of the accumulated data. The threshold total fatigue value represents the amount of accumulated fatigue stress or fatigue damage that could potentially result in a structural failure at the respective critical fatigue stress location at the example main wheel 110. If the comparator 266 determines that each total fatigue damage value of the large portion or subset of the total fatigue damage values, for each of the critical fatigue stress locations at the example main wheel 110, does not exceed the respective threshold total fatigue damage value for the example main wheel 110, then the example apparatus 250 has established statistically that the example main wheel 110 should not experience a failure during its service life on the multiple-axle aircraft 100. Thus, for each critical wheel location A-F, the comparator 266 of the example apparatus 250 is configured to determine whether or not each total fatigue damage value of a large portion or subset of the respective total fatigue damage values exceeds a threshold total fatigue damage value for the example main wheel 110. In other words, the example apparatus 250 uses the comparator 266 to determine whether or not the example main wheel 110 will produce a very high percentage of the total fatigue damage values at the respective critical location A-F that are less than the threshold total fatigue damage value. The example main wheel 110 may then be used on the multiple-axle aircraft 100 with the assurance that the fatigue damage accumulated during its respective service life will not result in a structural failure.

Figure 6:
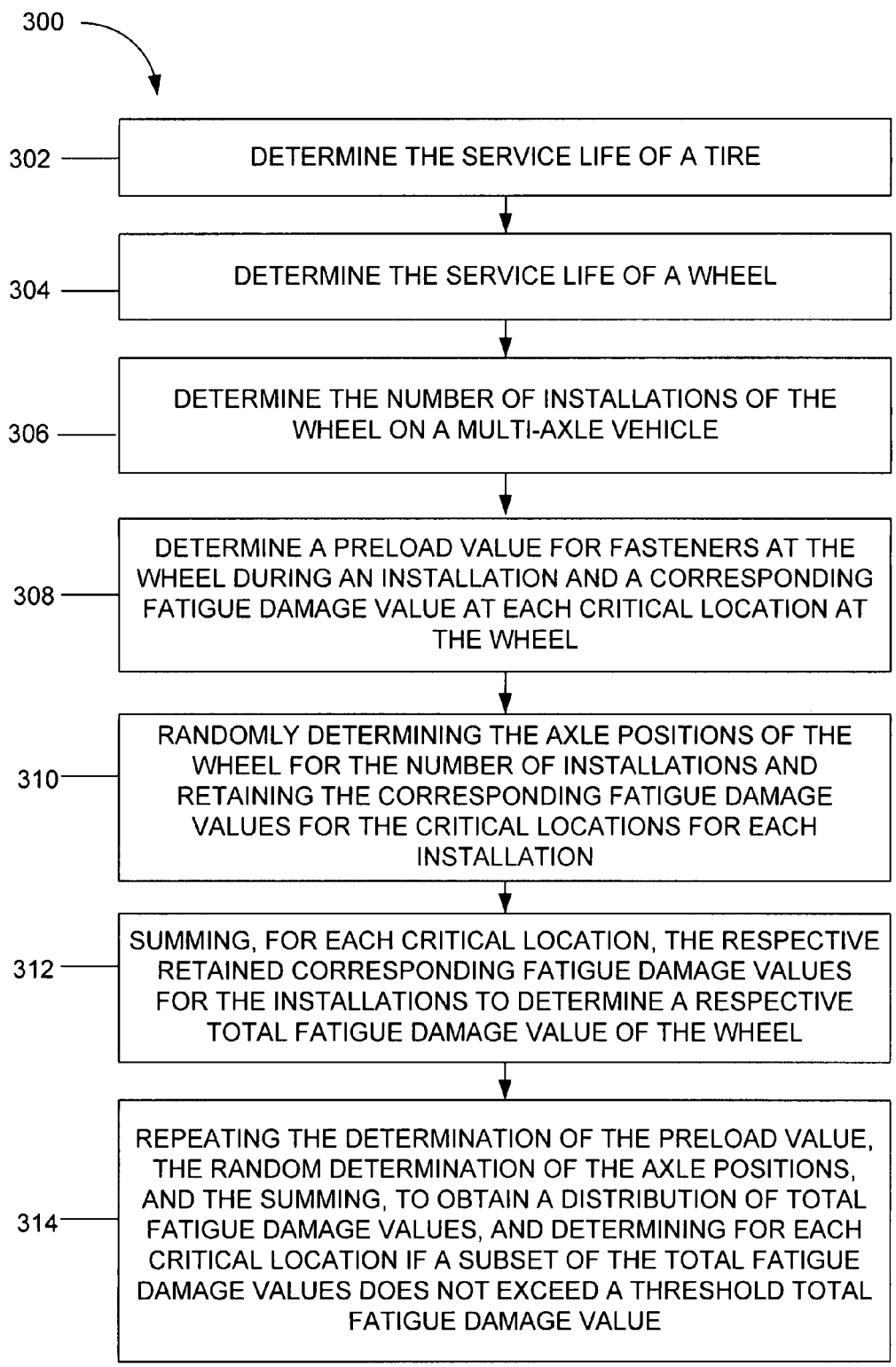
FIG. 6 is a flow diagram representative of an example method to design a wheel of a multiple-axle vehicle.

FIG. 6 is a flow diagram representative of example machine readable instructions 300 that may be executed to implement the example apparatus 250 of FIG. 3 to design a wheel of a multiple-axle vehicle. Although the example machine readable instructions 300 are described with reference to the flow diagram of FIG. 6, persons of ordinary skill in the art will readily appreciate that other methods of designing a wheel of a multiple-axle vehicle and, generally, implementing the example apparatus 250 of FIG. 3 may additionally or alternatively be used. For example, the order of execution of the blocks depicted in the flow diagram of FIG. 6 may be changed, and/or some of the blocks described may be rearranged, eliminated, or combined.

Turning in detail to the flow diagram of FIG. 6, initially the tire life value generator 256 (e.g., see FIG. 3) determines the service life of a tire (e.g., the tire life may be a constant value or selected at random from a normal distribution), at block 302, and the wheel life value generator 258 (e.g., see FIG. 3) determines the service life of a wheel (e.g., the example main wheel 110 in FIGS. 1 and 2), at block 304. At block 306, the installation quantity value generator 254 (e.g., see FIG. 3) determines the number of installations of the wheel (e.g., the number of tires or tire lives during the service life of the example main wheel 110 in FIGS. 1 and 2) on a multi-axle vehicle (e.g., the main axles 1a-4b of the multi-axle aircraft 100 in FIG. 1). Then, the torque preload value generator 264 (e.g., see FIG. 3) determines a preload value for fasteners at the wheel (e.g., the tie bolts 114 at the example main wheel 110 in FIG. 2) and the fatigue damage value generator 260 determines a corresponding fatigue damage value for each critical location at the wheel (e.g., the critical fatigue stress locations A-F of the example main wheel 110 in FIG. 2) during an installation, (block 308). The axle position generator 262 (e.g., see FIG. 3) then determines randomly the axle positions of the wheel (e.g., the twenty main wheel positions of the example main wheel 110 on the main axles 1a-4b in FIG. 1) for the number of installations and the fatigue damage value generator 260 retains the corresponding fatigue damage values for the critical locations (e.g., the critical fatigue stress locations A-F of the example main wheel 110 in FIG. 2) for each installation, (block 310). At block 312, for each critical location (e.g., the critical fatigue stress locations A-F of the example main wheel 110 in FIG. 2), the fatigue damage value generator 260 sums the respective retained corresponding fatigue damage values for the installations to determine a respective total fatigue damage value of the wheel (e.g., the example main wheel 110 in FIGS. 1 and 2). The torque preload value generator 264 then repeats the determination of the preload value, the axle position generator 262 repeats the determination of the axle positions (e.g., the twenty main wheel positions of the example main wheel 110 on the main axles 1a-4b in FIG. 1), the fatigue damage value generator 260 repeats the summing of the fatigue damage values for the installations, to obtain a distribution of total fatigue damage values, and the comparator 266 then (e.g., see FIG. 3) determines for each critical location (e.g., the critical locations A-F of the example main wheel 110 in FIG. 2) whether or not each total fatigue damage value of a predetermined portion or subset of the total fatigue damage values exceeds a threshold total fatigue damage value for the wheel (e.g., the example main wheel 110 in FIGS. 1 and 2), (block 314).

Figure 7:
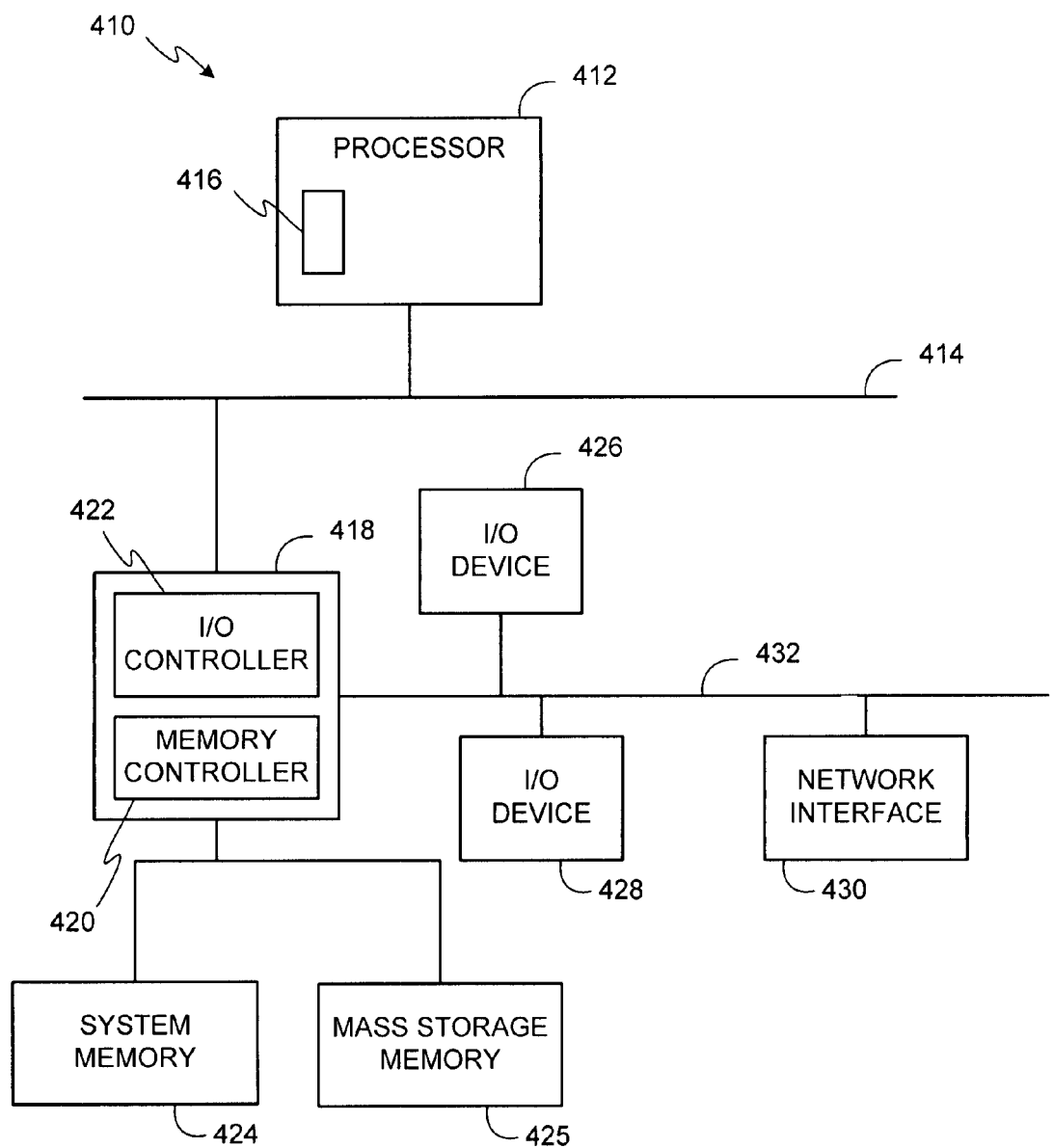
FIG. 7 is a block diagram of an example processor system that may be used to execute the example method of FIG. 6 to implement the example apparatus of FIG. 3.

FIG. 7 is a block diagram of an example processor system 410 that may be used to implement the example apparatus, methods, and articles of manufacture described herein. For example, the processor system 410 may be used to execute the machine readable instructions represented by the flow chart of FIG. 6 to implement any portion or all of the example apparatus 250 of FIG. 3 including the installation quantity value generator 254, the tire life value generator 256, the wheel life value generator 258, the fatigue damage value generator 260, the axle position generator 262, the torque preload value generator 264, and the comparator 266 of FIG. 3.

As shown in FIG. 7, the processor system 410 includes a processor 412 that is coupled to an interconnection bus 414. The processor 412 includes a register set or register space 416, which is depicted in FIG. 7 as being entirely on-chip, but which could alternatively be located entirely or partially off-chip and directly coupled to the processor 412 via dedicated electrical connections and/or via the interconnection bus 414. The processor 412 may be any suitable processor, processing unit or microprocessor. Although not shown in FIG. 7, the system 410 may be a multi-processor system and, thus, may include one or more additional processors that are identical or similar to the processor 412 and that are communicatively coupled to the interconnection bus 414.

The processor 412 of FIG. 7 is coupled to a chipset 418, which includes a memory controller 420 and an input/output (I/O) controller 422. A chipset provides I/O and memory management functions as well as a plurality of general purpose and/or special purpose registers, timers, etc. that are accessible or used by one or more processors coupled to the chipset 418. The memory controller 420 performs functions that enable the processor 412 (or processors if there are multiple processors) to access a system memory 424 and a mass storage memory 425.

The system memory 424 may include any desired type of volatile and/or non-volatile memory such as, for example, static random access memory (SRAM), dynamic random access memory (DRAM), flash memory, read-only memory (ROM), etc. The mass storage memory 425 may include any desired type of mass storage device including hard disk drives, optical drives, tape storage devices, etc.

The I/O controller 422 performs functions that enable the processor 412 to communicate with peripheral input/output (I/O) devices 426 and 428 and a network interface 430 via an I/O bus 432. The I/O devices 426 and 428 may be any desired type of I/O device such as, for example, a keyboard, a video display or monitor, a mouse, etc. The network interface 430 may be, for example, an Ethernet device, an asynchronous transfer mode (ATM) device, an 802.11 device, a digital subscriber line (DSL) modem, a cable modem, a cellular modem, etc. that enables the processor system 410 to communicate with another processor system.

While the memory controller 420 and the I/O controller 422 are depicted in FIG. 7 as separate functional blocks within the chipset 418, the functions performed by these blocks may be integrated within a single semiconductor circuit or may be implemented using two or more separate integrated circuits.

Although certain example apparatus, methods and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to analyze fatigue damage values of wheels each to be installed at a number of axle positions on a vehicle, comprising:
   (a) simulating installations by randomly determining the axle positions of each wheel on the vehicle;
   (b) determining at each of the axle positions for each wheel a fatigue damage value for each of a plurality of critical locations at the wheel during an installation;
   (c) storing the fatigue damage values of the critical locations for each installation;
   (d) summing the respective retained fatigue damage value for each critical location to determine a respective total fatigue damage value;
   (e) repeating (a), (b), (c) and (d) a number of times to obtain at each of the critical locations a distribution of total fatigue damage values; and
   (f) determining whether or not at least a subset of the total fatigue damage values at each of the critical locations exceeds a respective threshold total fatigue damage value.

2. A method as defined in claim 1, wherein the simulated installations of the wheel substantially equals an expected number of installations of the wheel.

3. A method as defined in claim 1, further including determining the number of installations of the wheel on the vehicle.

4. A method as defined in claim 3, wherein the number of installations is determined by approximately the number of tires that may be used by the wheel during a service life of the wheel.

5. A method as defined in claim 4, wherein a tire life of a tire may be one of a constant value or a value selected from a normal distribution of tire lives.

6. A method as defined in claim 1, wherein the critical locations are provided by determining locations subject to critical fatigue stress at the wheel.

7. A method as defined in claim 6, wherein repeating (a), (b), (c) and (d) continues until the fatigue damage value at each of the critical locations for a current installation is substantially the same as the fatigue damage value of the corresponding critical location for an immediately prior installation.

8. A method as defined in claim 1, further comprising determining, at each of the critical locations at the wheel, the fatigue damage value corresponding to a preload value of fasteners of the wheel.

9. A method as defined in claim 8, wherein the fasteners of the wheel are presumed to have the same preload value.

10. A method as defined in claim 9, wherein the preload value is determined for each of the simulated installations.

11. A method as defined in claim 8, wherein determining a preload value comprises randomly selecting one of a plurality of preload values to obtain a corresponding fatigue damage value, wherein the random selection of the preload value uses one of a uniform probability of selection or a highest probability of selection.

12. A method as defined in claim 1, wherein the subset comprises at least 95% of the total fatigue damage values.

13. An apparatus to analyze fatigue damage values of wheels each to be installed at a number of axle positions on a vehicle, comprising:
   (a) an axle position generator to simulate random determinations of the installed axle positions of each wheel on the vehicle;
   (b) a fatigue damage value generator to obtain the positions of each wheel from the axle position generator to determine at each of the axle positions for each wheel a fatigue damage value for each of a plurality of critical locations at the wheel during an installation, to store the fatigue damage values of the critical locations for each installation, to sum the respective retained corresponding fatigue damage value for each critical location to determine and store a respective total fatigue damage value, and to store total fatigue damage values of a distribution of respective total fatigue damage values obtained from repeating the summing of the fatigue damage values, and
   (c) a comparator to determine whether or not at least a subset of the respective total fatigue damage values at a critical location exceeds a respective threshold total fatigue damage value for the wheel.

14. The apparatus as defined in claim 13, further comprising an installation quantity value generator to determine a number of installations of the wheel to be simulated on the vehicle.

15. The apparatus as defined in claim 14, further comprising a tire life value generator to determine a life of a tire to be used on the wheel.

16. The apparatus as defined in claim 13, further comprising a wheel life value generator to determine a life of a wheel to be used on the vehicle.

17. The apparatus as defined in claim 13, further comprising a torque preload value generator to determine a preload value of fasteners of the wheel.

18. The apparatus as defined in claim 17, wherein a preload value is determined for each of the simulated installations.

19. The apparatus as defined in claim 17, wherein the fatigue damage value determined for each of the plurality of critical locations at the wheel during an installation is a function of the preload value.

20. A computer-readable medium storing computer readable instructions which, when executed by a computer, causes the computer to:
   (a) simulate installations by randomly determining the axle positions of each wheel on the vehicle;
   (b) determine at each of the axle positions for each wheel a fatigue damage value for each of a plurality of critical locations at the wheel during an installation;
   (c) store the fatigue damage values of the critical locations for each installation;
   (d) sum the respective retained fatigue damage value for each critical location to determine a respective total fatigue damage value;
   (e) repeat (a), (b), (c) and (d) a number of times to obtain at each of the critical locations a distribution of total fatigue damage values; and
   (f) determine whether or not at least a subset of the total fatigue damage values at each of the critical locations exceeds a respective threshold total fatigue damage value.

* * * * *